July 6, 1965 T. C. F. STOTT 3,192,786
TOOTHED MESHING GEARS WITH PARALLEL AXES
Filed Feb. 11, 1963 3 Sheets-Sheet 1
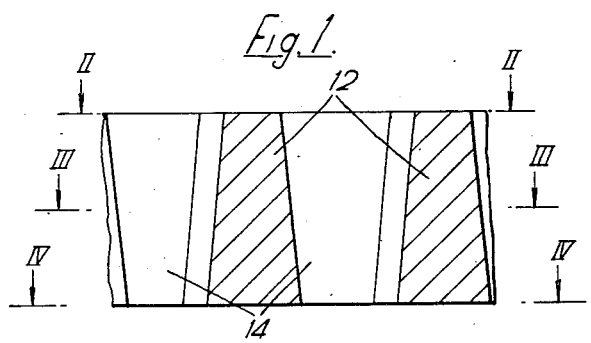
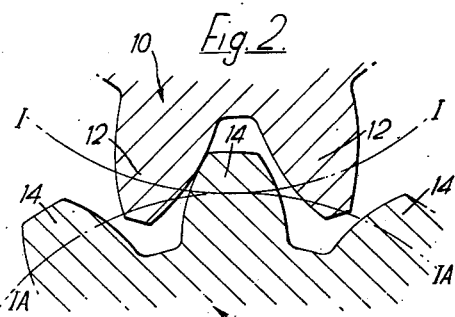
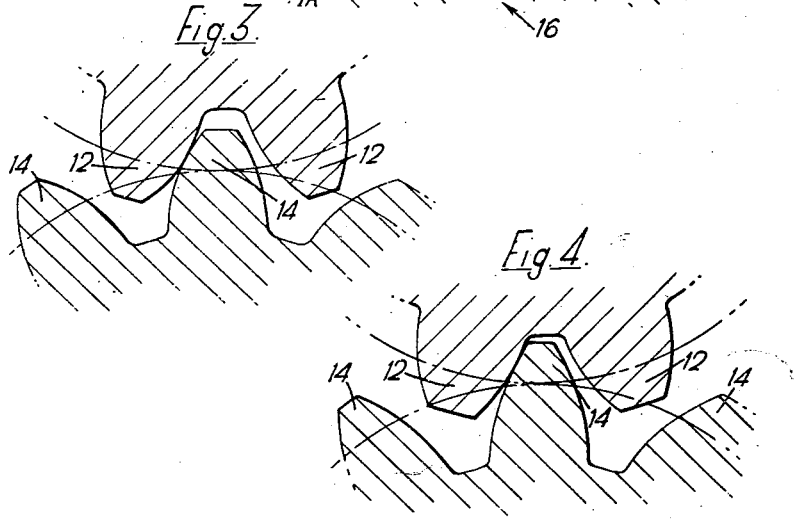
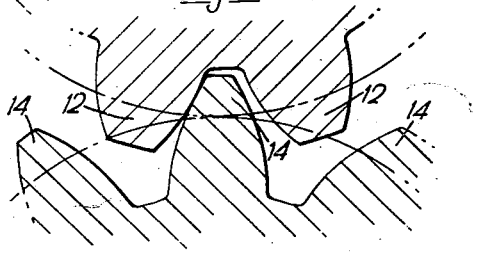
Inventor
Thomas Charles Felix Stott
BY
Attorney July 6, 1965  T. C. F. STOTT  3,192,786
TOOTHED MESHING GEARS WITH PARALLEL AXES
Filed Feb. 11, 1963  3 Sheets-Sheet 2

Inventor
Thomas Charles Felix Stott
BY
A. M. Heiter
Attorney

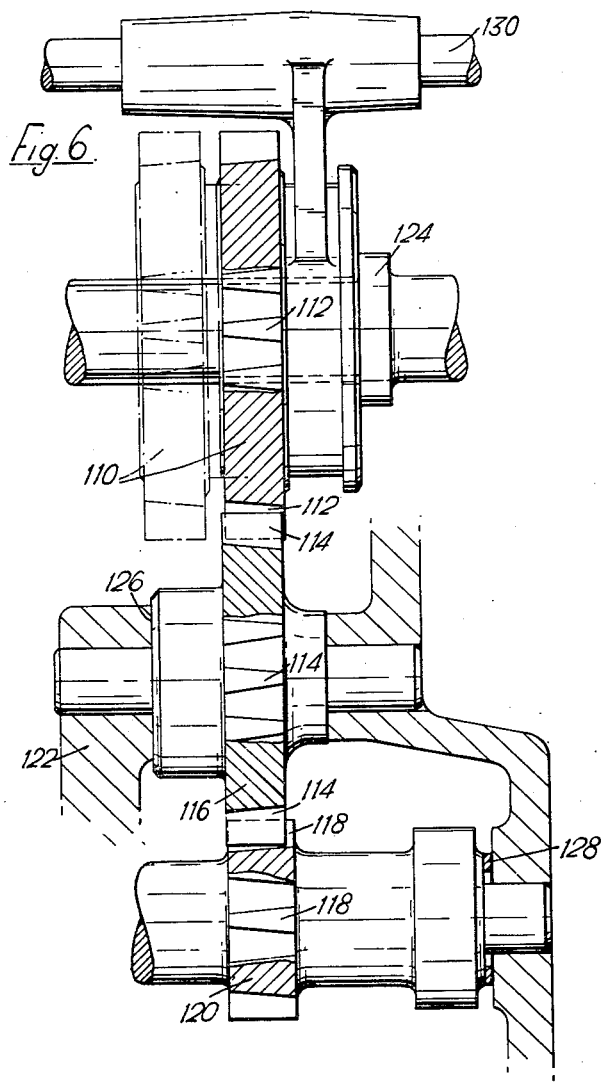

United States Patent Office 3,192,786
Patented July 6, 1965

3,192,786
TOOTHED MESHING GEARS WITH PARALLEL AXES
Thomas Charles Felix Stott, Harpenden, England, assignor to General Motors Corporation, Detroit, Mich., a corporation of Delaware
Filed Feb. 11, 1963, Ser. No. 257,473
Claims priority, application Great Britain, Feb. 16, 1962, 5,974/62
11 Claims. (Cl. 74—333)

This invention relates to toothed meshing gear assemblies which comprise, on parallel axes, a first gear which is axially slidable into meshing engagement with a second gear. Such sliding mesh gear trains are used for example in motor vehicle gear boxes.

In sliding mesh gear assemblies according to the present invention, the meshing gears are prevented from jumping out of engagement when under load by the use of gear teeth with both flanks tapered, in conjunction with appropriately disposed thrust members for taking up the axial thrusts arising during operation.

The gear assembly may in the simplest case have only a pair of meshing gears, but in a preferred application the gear assembly comprises the layshaft gear, idler gear and mainshaft gear used to establish reverse drive in a motor vehicle gearbox.

The scope of the monopoly is defined by the appended claims; the invention and how it can be performed are hereinafter particularly described with reference to the accompanying drawings, in which:

FIGURE 1 is a sectional plan view showing tapered teeth of a pair of meshing gears of a sliding mesh gear assembly according to the invention;

FIGURE 2 is a cross-section on the line II—II of FIGURE 1;

FIGURES 3 and 4 are cross-sections similar to FIGURE 2, but respectively on the lines III—III and IV—IV of FIGURE 1;

FIGURE 6 is an elevation, with some parts in section, of an alternative embodiment of a sliding mesh gear assembly according to the invention.

Figure 5:
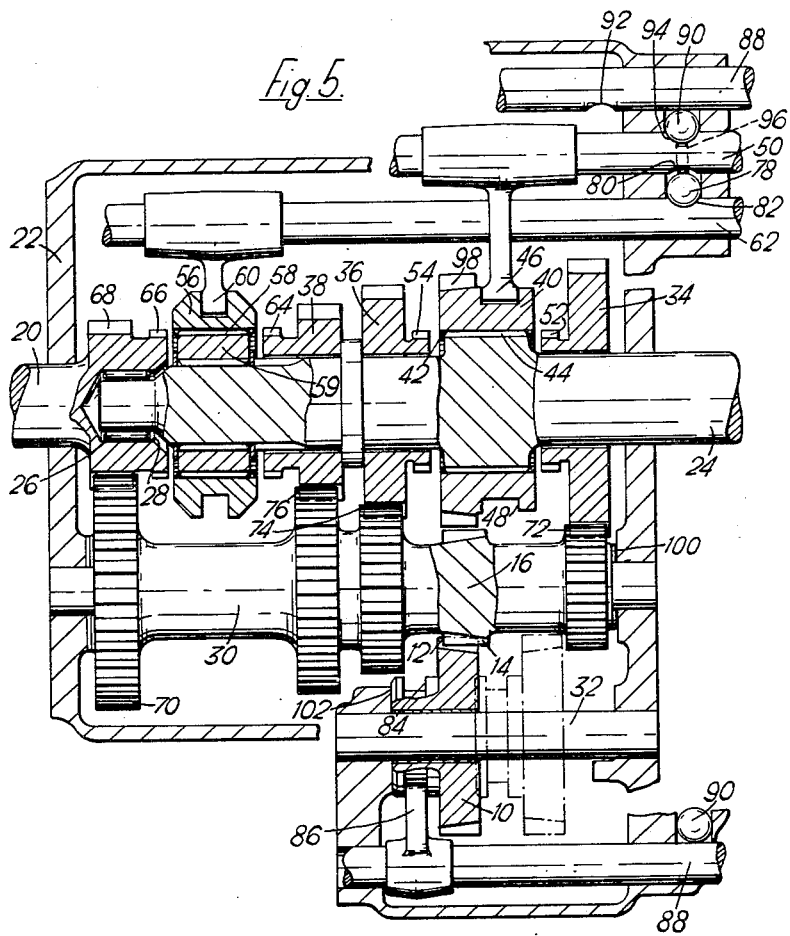
FIGURE 5 is a developed longitudinal section with some parts in elevation, showing, somewhat diagrammatically, a motor vehicle 4-speed and reverse gearbox incorporating a preferred embodiment of a sliding mesh gear assembly according to the invention.

FIGURES 1 to 4 illustrate in a general manner one characteristic feature of the sliding mesh gear assembly according to the present invention, namely the axial tapering of both flanks of the teeth of a pair of toothed gears which are rotatable about parallel axes. As shown in FIGURE 2, for example, a first gear 10 has teeth 12 (shown shaded) which mesh with teeth 14 (shown unshaded) of a second gear 16, which is rotatable about an axis parallel to the axis of rotation of the gear 10.

In FIGURE 2, part of a pitch circle of the gear 10 is indicated as an arc I—I and part of a pitch circle of the gear 16 as indicated as an arc IA—IA. The sectional plan view shown in FIGURE 1 is actually a section taken along the arc I—I.

The tapered tooth flanks of each gear are preferably produced by causing a gear tooth cutter to travel along an axis which is in the same radial plane as the axis of rotation of the gear and is also inclined relatively to the axis of rotation of the gear, whereby the passage of the cutter through the gear is shallower at one axial end of the gear than at the other. The amount of inclination is selected to give a taper adequate to resist the known jump-out force, for example a taper of about .002" for each flank from one axial end of the tooth to the other. A taper of .001" per flank has also been found useful, that is, the tooth is .002" thicker at one axial end than at the other.

This use of an inclined cutter axis is preferred because the tooth geometry is unaffected, as a result of which conjugate teeth can be obtained without difficulty. The effect on the tooth proportions of inclining the cutter axis can be seen by a comparison of FIGURES 2 to 4: FIGURE 3 shows that at their mid-point the teeth 12 and 14 have normal proportions, whereas FIGURE 2 shows that at one axial end the shaded teeth 12 are thinner and have a greater depth than the teeth 14, and FIGURE 4 shows that at the other axial end the shaded teeth 12 are thicker and have less depth than the teeth 14.

Alternatively, the tapered flanks can be formed or finished by the use of a shaving cutter which has complementary teeth and which is fed in radially, or the taper can be formed or finished by setting the shaving cutter and gear with inclined axes, in practice converging axes, as described above. A similar method of forming the tapered tooth flanks can be used for other methods of production, for example grinding. However, as stated above, the use of a gear cutter with an inclined axis is preferred.

FIGURE 5 illustrates a motor vehicle 4-speed and reverse gearbox in which a sliding mesh gear assembly according to the invention is used to provide the reverse ratio. The gearbox has an input shaft 20 which is rotatably supported by the gearbox casing 22, and an output shaft 24 (mainshaft) which is coaxial with the input shaft 20 and is journalled at its left-hand end by way of roller bearings 26 in a bore 28 of the input shaft 20, the output shaft being rotatably supported towards its right-hand end by means of the gearbox casing 22. A layshaft 30 is rotatably supported at both ends by the gearbox casing, and has its axis of rotation parallel to the axis of rotation of the output shaft 24. In addition, an idler gear shaft 32 is supported at both ends by the gearbox casing 22 with its axis parallel to the axis of rotation of the output shaft 24 and the layshaft 30.

First, second, and third speed gearwheels 34, 36 and 38 of successively decreasing diameter are rotatably mounted at spaced intervals along the output shaft 24. A sleeve 40 provided with internal axial teeth 42 is slidable in the manner of a clutch sleeve along external splines 44 on the output shaft by means of a selector fork 46, which in the conventional manner engages the walls of an annular groove 48 of the sleeve 40 and is slidable by means of a selector fork rod 50. Axial movement of the selector fork rod 50 to the right brings the internal teeth 42 of the sleeve 40 into engagement with external dog teeth 52 disposed on the first speed gearwheel 34, thereby coupling the first speed gearwheel to the output shaft 24 in known manner. Movement of the selector fork rod 50 to the left brings the internal teeth 44 into engagement with dog teeth 54 on the second speed gearwheel 36 to couple this second speed gearwheel to the output shaft for engagement of second gear.

A second sleeve 56 mounted on a further set of splines 58 on a hub 59 fixed to the output shaft 24 is slidable to the right by means of a selector fork 60 and selector fork rod 62 to engage dog teeth 64 on the third speed gearwheel 38 to couple the third speed gearwheel to the output shaft 24 for engagement of third gear. Movement of the selector fork 60 to the left by means of the selector fork rod 62 causes the sleeve 56 to engage external dog teeth 66 on the input shaft 20 and thereby establish direct drive (top gear) from the input shaft 20 to the output shaft 24.

The input shaft 20 drives the layshaft 30 in the conventional manner by means of head gears consisting of a gear 68 on the input shaft which meshes with a gear 70 on the layshaft to cause rotation of the layshaft whenever the input shaft is being rotated. The layshaft is in the conventional manner formed with gears 72, 74 and 76 which are in constant mesh with, respectively, the first speed gearwheel 34, the second speed gearwheel 36 and the third speed gearwheel 38, whereby these three gearwheels 34, 36 and 38 are maintained in constant rotation, but at different speeds, whenever the input shaft 20 is being rotated.

Thus any of the four forward gears may be engaged by appropriate movement of one or other of the selector fork rods 50 and 62. Simultaneous movement of the rods 50 and 62 is prevented by means of a conventional ball interlock device including a ball 78 which cooperates with recesses 80 and 82 in the rods 50 and 62 respectively. Movement of either rod causes the ball to be cammed into the recess in the other rod, so holding the said other rod in a neutral position.

The gearbox also includes a sliding mesh reverse gear train comprising as input gear a gear 16 which forms part of the layshaft 30 and has teeth 14 with both flanks tapered as shown in FIGURE 1, and also comprising an idler gear 10 which is mounted for rotation on the idler shaft 32 and has teeth 12 with both flanks tapered as shown in FIGURE 1. The idler gear 10 includes an annular groove 84 which receives a striker fork 86: the striker fork is movable axially by means of a striker fork rod 88 to effect axial sliding movement of the idler gear 10 between a disengaged position shown in interrupted lines in FIGURE 5, and an engaged position shown in full lines in this figure.

The striker fork rod 88 is provided with an interlock device comprising a ball 90 which can enter a recess 92 in the rod 88 when the rod is in the disengaged position. When the rod 88 is moved to the engaged position, however, the ball 90 is carried out of the recess 92 and into a recess 94 in the first and second speed striker fork rod 50 to hold the rod 50 in its neutral position. The ball 90 also presses on the end of a pin 96 which is located in a cross bore of the rod 50 between the recesses 94 and 80, thereby moving this pin along the cross bore such that the other end of the pin holds the ball 78 in the recess 82 of the third and fourth speed striker fork rod 62, thereby holding this rod 62 in its neutral position.

For engagement of reverse gear, therefore, the reverse gear striker fork rod 88 is moved to its engaged position, whereby the other two striker fork rods are held in their neutral positions and the teeth 12 of the idler gear 10 are slid into meshing engagement with the teeth 14 of the layshaft gear 16, the teeth of the idler gear also being in meshing engagement with tapered gear teeth 98 formed on the sleeve 40. As stated, for reverse drive the sleeve 40 is held in its neutral position by means of the second speed selector fork rod 50, and the reverse rotation which is imparted to the sleeve 40 by the idler gear 10 is transmitted by means of the splines 44 and 42 to the output shaft 24.

The tapers of the interengaging tooth flanks of the teeth 12 and 14 are such that the wider ends of the teeth 12 of the idler gear 10 are to the left as viewed in FIGURE 5, and the wider ends of the teeth 14 of the layshaft gear 16 are to the right as viewed in this figure. Similarly, both flanks of the teeth 98 which engage the tapered flanks of the teeth 12 of the idler gear 10 have a taper which is complementary to the taper of the idler gear teeth 12, that is, the wider ends of the teeth 98 are to the right.

The result of the complementary tapering of the engaging flanks of the teeth 14, 12 and 98 is that, during reverse gear operation, the idler gear 10 is biased to the left as viewed in FIGURE 5, and both the layshaft gear 16 and the sleeve 40 (which effectively forms a mainshaft gear) are biased to the right. Because both flanks of the various gear teeth are tapered, the direction of bias is the same for a given gear irrespective of whether the vehicle is in the normal driving condition in which the layshaft gear 16 is the input gear and the mainshaft gear (sleeve 40) is the output gear, or in the overrun condition in which the mainshaft gear forms the input gear and the layshaft gear forms the output gear. The axial thrust of the layshaft gear 16 to the right is taken by means of an annular thrust bearing member 100 which is disposed adjacent the gearbox casing, and the axial thrust of the idler gear 10 to the left is taken by means of a thrust face 102 formed by a part of the gearbox casing. The axial thrust of the mainshaft gear (sleeve 40) to the right is taken through the first and second speed selector fork rod 50 and the interlock ball 90 to the gearbox casing.

The effect of the tapering of both flanks of the teeth of the reverse gear train may be summarized as follows. During reverse gear operation, the layshaft gear 16, the idler gear 10 and the mainshaft gear (sleeve 40) are each biased in one or other direction, the direction of bias of each gear being the same irrespective of whether the reverse gear train is in the normal drive condition or the overrun condition, and axial movement resulting from the axial bias is limited by way of the thrust members constituted by the annular thrust bearing member 100, the thrust face 102 and the interlock ball 90. In this manner "gear jump-out" of the idler gear 10 is reliably prevented, since the amount of taper chosen to bias the gear towards the "in gear" position is greater than any misalignment tending to cause gear jump-out.

FIGURE 6 shows an alternative embodiment of a sliding mesh gear assembly according to the invention which is particularly suitable for use in a 3-speed and reverse gearbox. This reverse gear assembly is similar to that described with reference to FIGURE 5, except that, in the reverse gear assembly shown in FIGURE 6, reverse gear is engaged by sliding the mainshaft gear, the idler gear not being free to move axially. Specifically, as shown in FIGURE 6, a main shaft gear 110 is slidable from a disengaged position shown in interrupted lines to an engaged position shown in full lines. In the engaged position, axially tapered teeth 112 of the mainshaft gear 110 are in meshing engagement with complementarily tapered teeth 114 of an idler gear 116, the teeth 114 also meshing with complementarily tapered teeth 118 of a layshaft gear 120. FIGURE 6 indicates the sense of the tapers of the various gear teeth, namely that the wide ends of the teeth 112 and 118 are to the right, whereby the mainshaft gear and idler gear are biased to the right during operation, and that the wide ends of the teeth 114 are to the left, whereby the idler gear 116 is biased to the left during operation. The resulting axial movement of the mainshaft gear 110 to the right is limited by means of a shoulder 124 on the mainshaft; the axial movement of the idler gear 116 to the left is limited by means of a thrust face 126 on the gearbox casing 122; and the axial movement of the layshaft gear 120 to the right is limited by an annular thrust bearing member 128 adjacent the gear box casing. As in the embodiment shown in FIGURE 5, the dispositions of the thrust members in relation to the tapers on both flanks of the gear teeth shown in FIGURE 6 are such as reliably to prevent "gear jump-out" during reverse gear operation in both the normal drive and the overrun conditions.

For applications in which it is not convenient to have the shoulder 124 on the mainshaft, the axial thrust on the mainshaft gear 110 can be taken by way of a ball or other interlock device (not shown) cooperating with the gearbox casing and with a reverse selector fork rod 130 used to slide the mainshaft gear 110 between its disengaged and engaged positions.

Although the specific embodiments of the invention have been described as incorporating a ball-type interlock device through which the axial thrust on at least one gear is transmitted to the gearbox casing, the interlock device could be of any construction which will positively locate the striker fork rod in question relatively to the gearbox casing or to some other part which is stationary relatively to the rotatable parts of the gear assembly.

I claim:

1. A sliding mesh gear assembly comprising parallel input, idler and output axles, a toothed input gear disposed on the input axle, a toothed output gear disposed on the output axle and a toothed idler gear which is axially slidable along the idler axle in one direction into meshing engagement with both the input gear and the output gear, both flanks of the teeth of the respective gears being axially tapered such that the interengaging pairs of tooth flanks have complementary tapers in a sense such that during operation of the idler gear is biased in the said one direction irrespective of which gear is driving, a first thrust member adapted to limit axial movement of the idler gear in the said one direction, and second and third thrust members respectively adapted to limit axial movement of the input and output gears in the opposite direction.

2. A sliding mesh gear assembly according to claim 1, wherein the first and second thrust members comprise radial abutment faces.

3. A sliding mesh gear assembly according to claim 2, wherein the output gear is axially slidable along the output shaft by means of a selector mechanism but is prevented from rotating relatively to the output shaft, and the third thrust member comprises an interlock device forming part of the selector mechanism.

4. A sliding mesh gear assembly according to claim 3, wherein the opposite axial ends of the output gear are formed with dog teeth, in the manner of a double clutch sleeve, for selective engagement with corresponding dog teeth on a pair of gearwheels which are rotatably mounted on the output shaft.

5. A sliding mesh gear assembly comprising parallel input, idler and output axles, a toothed idler gear disposed on the idler axle, a toothed input gear which is disposed on the input axle and is in meshing engagement with the idler gear, a toothed output gear which is disposed on the output axle and is axially slidable in one direction into meshing engagement with the idler gear, both flanks of the teeth of the respective gears being axially tapered such that the interengaging pairs of tooth flanks have complementary tapers in a sense such that during operation the input gear and the output gear are biased in the said one direction irrespective of which gear is driving, first and second thrust members adapted to limit axial movement of the output gear and the input gear respectively in the said one direction, and a third thrust member adapted to limit axial movement of the idler gear in the opposite direction.

6. A sliding mesh gear assembly according to claim 5, wherein the second and third thrust members comprise radial abutment faces.

7. A sliding mesh gear assembly according to claim 6, wherein the first thrust member also comprises a radial abutment face.

8. A sliding mesh gear train according to claim 6, wherein the first thrust member comprises an interlock device forming part of a selector mechanism for axially sliding the output gear.

9. In a motor vehicle gearbox, a sliding mesh reverse gear assembly comprising a pair of parallel axles, a toothed gear mounted on each axle, the first gear being axially slidable in one direction into meshing engagement with the second gear, both flanks of the teeth of the respective gears being axially tapered such that the interengaging tooth flanks have complementary tapers in a sense such that during operation the first gear is biased in the said one direction irrespective of which gear is driving, a first thrust member adapted to limit axial movement of the first gear in the said one direction, and a second thrust member adapted to limit axial movement of the second gear in the opposite direction.

10. In a motor vehicle gearbox, a sliding mesh reverse gear assembly comprising parallel input, idler and output axles, a toothed input gear disposed on the input axle, a toothed output gear disposed on the output axle and a toothed idler gear which is axially slidable along the idler axle in one direction into meshing engagement with both the input gear and the output gear, both flanks of the teeth of the respective gears being axially tapered such that the interengaging pairs of tooth flanks have complementary tapers in a sense such that during operation the idler gear is biased in the said one direction irrespective of which gear is driving, a first thrust member adapted to limit axial movement of the idler gear in the said one direction, and second and third thrust members respectively adapted to limit axial movement of the input and output gears in the opposite direction.

11. In a motor vehicle gearbox, a sliding mesh reverse gear assembly comprising parallel input, idler and output axles, a toothed idler gear disposed on the idler axle, a toothed input gear which is disposed on the input axle and is in meshing engagement with the idler gear, a toothed output gear which is disposed on the output axial and is axially slidable in one direction into meshing engagement with the idler gear, both flanks of the teeth of the respective gears being axially tapered such that the interengaging pairs of tooth flanks have complementary tapers in a sense such that during operation the input gear and the output gear are biased in the said one direction irrespective of which gear is driving, first and second thrust members adapted to limit axial movement of the output gear and the input gear respectively in the said one direction, and a third thrust member adapted to limit axial movement of the idler gear in the opposite direction.

References Cited by the Examiner
UNITED STATES PATENTS

| 2,953,035 | 9/60 | Herr | 74—477 |
| 3,043,158 | 7/62 | Herr | 74—462 |

DON A. WAITE, *Primary Examiner.*